United States Patent [19]

Nylander-Hill

[11] Patent Number: 5,490,149
[45] Date of Patent: Feb. 6, 1996

[54] TACTICAL READ ERROR RECOVERY STRATEGY BASED ON DYNAMIC FEEDBACK

[75] Inventor: Pamela R. Nylander-Hill, Tucson, Ariz.

[73] Assignee: International Business Machines Corporation, Armonk, N.Y.

[21] Appl. No.: 174,656

[22] Filed: Dec. 28, 1993

[51] Int. Cl.⁶ ................................................. G11B 20/18
[52] U.S. Cl. ...................... 395/182.03; 360/53; 371/40.1; 395/185.05
[58] Field of Search ................................. 371/7, 13, 40.1; 364/266.5; 360/53

[56] References Cited

U.S. PATENT DOCUMENTS

| | | | |
|---|---|---|---|
| 4,058,851 | 11/1977 | Scheuneman | 395/575 |
| 4,209,809 | 6/1980 | Chang et al. | 360/53 |
| 4,543,628 | 9/1985 | Pomfret | 395/275 |
| 4,549,295 | 10/1985 | Purvis | 371/13 |
| 4,783,784 | 11/1988 | Ishiguro et al. | 371/13 |
| 4,791,642 | 12/1988 | Taylor et al. | 371/38 |
| 4,837,675 | 6/1989 | Bean et al. | 395/575 |
| 4,841,439 | 6/1989 | Nishikawa et al. | 364/200 |
| 4,847,795 | 7/1989 | Baker et al. | 364/579 |
| 4,866,712 | 9/1989 | Chao | 371/5.1 |
| 4,972,453 | 11/1990 | Daniel, III et al. | 379/10 |
| 5,090,014 | 2/1992 | Polich et al. | 371/15.1 |
| 5,107,499 | 4/1992 | Lirov et al. | 371/15.1 |
| 5,107,500 | 4/1992 | Wakamoto et al. | 371/15.1 |
| 5,159,597 | 10/1992 | Monahan et al. | 371/16.1 |
| 5,210,860 | 5/1993 | Pfeffer et al. | 395/575 |
| 5,220,569 | 6/1993 | Hartness | 371/37.7 |
| 5,274,646 | 12/1993 | Brey et al. | 371/40.1 |
| 5,331,476 | 7/1994 | Fry et al. | 360/53 |
| 5,351,247 | 9/1994 | Dow et al. | 371/15.1 |
| 5,371,745 | 12/1994 | Kiyonaga et al. | 371/13 |
| 5,379,162 | 1/1995 | Cunningham et al. | 360/53 |

Primary Examiner—Stephen M. Baker
Attorney, Agent, or Firm—Baker, Maxham, Jester & Meador

[57] ABSTRACT

A tape drive data storage apparatus incorporating the inventive concepts herein includes a control system for reading and writing host data on a streaming tape medium, an error correction coding (ECC) system for detecting and correcting data transfer errors, and an error recovery system for performing non-ECC correctable error recovery. The error recovery system is dynamically controlled to perform tactical error recovery in accordance with a novel error recovery method. As the tape drive apparatus performs read and/or write data transfer operations on a tape medium loaded in the tape drive, error recovery options are implemented on the basis of dynamic feedback peculiar to the current block in error. Upon invocation of an error recovery operational mode, the data storage apparatus performs error recovery on the current data block using a predetermined set of error recovery implementation options. As error recovery progresses, the option set is scored based on its effectiveness and the score is dynamically evaluated. Ongoing error recovery is performed on the block using a refined set or subset of error recovery implementation options based on the score of the previously applied options. Additional error recovery options may be inserted as they become appropriate. The process is repeated Until successful error recovery is achieved or until available error recovery implementation options are exhausted.

31 Claims, 11 Drawing Sheets

FIG. 4

| Card | BIT FIELDS | | | | | | RANGE FIELDS | | | | Cond |
|---|---|---|---|---|---|---|---|---|---|---|---|
| | OCP | CIEXP | EXMOD | RELGN | REACQ | DROPT | CNTR | WNDLN | | | |
| 1 | 0• | 0• | 0• | 1• | 0• | 8• | 16• | 22• | | | |
| 2 | 1 | 0• | 0• | 1• | 0• | 8• | 16• | 22• | | | |
| 3 | 1 | 1 | 0• | 1• | 0• | 8• | 16• | 22• | | | |
| 4 | 0• | 0• | 1 | 1• | 0• | 8• | 16• | 22• | | | |
| 5 | 0• | 0• | 0• | 0 | 0• | 8• | 16• | 22• | | | |
| 6 | 0• | 0• | 0• | 0 | 1 | 8• | 16• | 22• | | | 1 |
| 7 | 0• | 0• | 0• | 0 | 0 | 8• | 16• | 22• | | | 2 |

| Procedure | Hand | Deck | Suit | Next Hand | ResumeHand | Retry Ceiling |
|---|---|---|---|---|---|---|
| ACQ_PES | 1 | ACQ_Deck | 0 | 2 | 1 | n cds * 7 bids |
| | 2 | ACQ_Deck | 1 | 3 | 2 | |
| | 3 | ACQ_Deck | 2 | 4 | 3 | n cds * 3 bids |
| | 4 | IPS_Deck | 3 | 5 | 4 | |
| | 5 | IPS_Deck | 1 | 6 | 5 | |
| | 6 | IPS_Deck | 2 | 7 | 6 | |
| | 7 | IPS_Deck | 0 | 8 | 7 | |
| | 8 | IPS_Deck | 1 | 9 | 8 | |
| | 9 | IPS_Deck | 2 | 0 | 9 | 18/390 (n = 1,10) |
| ACQ_IPS | 1 | IPS_Deck | 0 | 2 | 1 | |
| | 2 | IPS_Deck | 1 | 3 | 2 | |
| | 3 | IPS_Deck | 2 | 4 | 3 | |
| | 4 | IPS_Deck | 3 | 5 | 4 | |
| | 5 | IPS_Deck | 0 | 6 | 5 | |
| | 6 | IPS_Deck | 1 | 7 | 6 | |
| | 7 | IPS_Deck | 2 | 0 | 7 | 21/210 (n = 1,10) |
| DATA | 1 | Data_Deck | 0 | 2 | 1 | m cds |
| | 2 | Data_Deck | 1 | 3 | 2 | |
| | 3 | Data_Deck | 2 | 4 | 3 | |
| | 4 | Data_IPS Deck | 3 | 5 | 4 | m * 2 bids |
| | 5 | Data_IPS Deck | 1 | 6 | 5 | |
| | 6 | Data_IPS Deck | 2 | 0 | 6 | 9/90 (m = 1,10) |

| Deck | Suit | Suit Method | Suit Method Parm |
|---|---|---|---|
| ACQ_Deck | 0 | NOMINAL | NOMINAL |
|  | 1 | TENSION | INCR |
|  | 2 | TENSION | DECR |
| IPS_Deck | 0 | NOMINAL | NOMINAL |
|  | 1 | TENSION | INCR |
|  | 2 | TENSION | DECR |
|  | 3 | OPPGAP | OPP |
| Data_Deck | 0 | TENSION | NOMINAL |
|  | 1 | TENSION | NOMINAL |
|  | 2 | TENSION | DECR |
| Data_IPS_Deck | 0 | NOMINAL | NOMINAL |
|  | 1 | TENSION | INCR |
|  | 2 | TENSION | DECR |
|  | 3 | OPPGAP | OPP |
|  |  | TENSION | NOMINAL |

| Deck | Card | Biddable | AcqSpec Card | DataSpec Card | Next Card |
|---|---|---|---|---|---|
| ACQ_Deck | 1 | YES | 1 | 0 | 2 |
|  | 2 | NO | 2 | 0 | 3 |
|  | 3 | NO | 3 | 0 | 4 |
|  | 4 | NO | 4 | 0 | 1 |
| IPS_Deck | 1 | YES | 1 | 0 | 2 |
|  | 2 | NO | 2 | 0 | 3 |
|  | 3 | NO | 3 | 0 | 4 |
|  | 4 | NO | 4 | 0 | 1 |
| Data_Deck | 1 | NO | 0 | 1 | 2 |
|  | 2 | NO | 0 | 2 | 3 |
|  | 3 | NO | 0 | 3 | 4 |
|  | 4 | NO | 0 | 4 | 5 |
|  | 5 | NO | 0 | 5 | 6 |
|  | 6 | NO | 0 | 6 | 0 |
| Data_IPS_Deck | 1 | YES | 0 | 1 | 2 |
|  | 2 | NO | 0 | 2 | 3 |
|  | 3 | NO | 0 | 3 | 4 |
|  | 4 | NO | 0 | 4 | 5 |
|  | 5 | NO | 0 | 5 | 6 |
|  | 6 | NO | 0 | 6 | 1 |

FIG. 8

| Deck | DTI Method | Orientation | Bid |
|---|---|---|---|
| ACQ_Deck | SERVO_PES | FORWARD | NOMINAL |
| | SERVO_PES | FORWARD | INCR +1 |
| | SERVO_PES | FORWARD | INCR +2 |
| | SERVO_PES | FORWARD | INCR +3 |
| | SERVO_PES | FORWARD | DECR -1 |
| | SERVO_PES | FORWARD | DECR -2 |
| | SERVO_PES | FORWARD | DECR -3 |
| IPS_Deck | SERVO_IPS | FORWARD | LOCK 0 |
| | SERVO_IPS | FORWARD | LOCK +1 |
| | SERVO_IPS | FORWARD | LOCK -1 |
| Data_IPS_Deck | SERVO_IPS | FORWARD | LOCK +1 |
| | SERVO_IPS | REVERSE | LOCK -1 |

FIG. 9

TACTICAL READ ERROR RECOVERY STRATEGY BASED ON DYNAMIC FEEDBACK

BACKGROUND OF THE INVENTION

The present invention is directed generally to the recording and retrieval of digital information on magnetic tape, and more particularly to methods and procedures for recovering from errors occurring during data transfer operations.

Conventional tape drive data storage apparatus employ various error correction and recovery methods to detect and correct data errors which, if left unresolved, would compromise the integrity of information read from or written to the magnetic tape media. Events which can lead to data errors include defects on the media, debris between the tape head and the media, and other conditions that interfere with head/media data transfer operations.

Error correction and recovery may be thought of as two distinct operations that are employed at different stages of error processing. Error correction is conventionally implemented using error correction coding (ECC) techniques in which random host data to be placed on a tape medium is encoded in a well-defined structure by introducing data-dependent redundancy information. The presence of data errors is detected when the encoded structure is disturbed. The errors are corrected by making minimal alternations to reestablish the structure. ECC error correction is usually implemented "on-the-fly" as data is processed by the tape drive apparatus. The well-known Reed-Solomon code is one cyclic encoding scheme which has been proposed for ECC error correction. Other encoding schemes are also known in the art.

Error recovery occurs when ECC error correction is unable to correct data errors. The error recovery process usually requires stopping the tape and reprocessing a data block in which an error was detected. Error recovery can include a variety of hardware and microcode configuration options. Microcode-based error recovery utilizes software routines executed by the tape drive microprocessor. Hardware-based error recovery utilizes hardwired logic components and systems controlled by microcode that adjust the hardware parameters. Typical microcode-controlled error recovery options include tape refresh operations wherein a tape is wound to its end and brought back to the error recovery point, tape backhitch or "shoeshine" operations wherein a tape is drawn back and forth across the tape head, and backward tape read operations, to name a few. Typical hardware-controlled error recovery options include tape tension adjustments, tape servo adjustments, track voting threshold adjustments, track synchronization adjustments, ECC pointer realignment, and changes to block and inter-block gap detection thresholds.

Error recovery often involves implementation of a complex series of hardware and microcode configuration options that are designed to be used in an optimum sequence of retry attempts. When the number of options increases, the number of retry attempts increases in accordance with the newly created configuration permutations. When the total number of error recovery retries exceeds a reasonable maximum, a decision must often be made to eliminate or reduce recovery scenarios. In prior art error recovery systems, those decisions are made at the design level where it is difficult to assess what benefit overlooked options might have provided. The advantages of the unimplemented options are thereby lost.

As to error recovery options that are implemented at the design level, one or more of such recovery options may be effective for some error recovery conditions but not others. For example, errors caused by localized tape defects or track fading due to debris adhering to either the tape media or the read/write heads can affect tracks for long stretches of tape as debris is dragged along. Errors of this type can often be resolved by reversing tape motion and dislodging the debris. In that case, other error recovery procedures may be unnecessary but will be performed in any event in accordance with the preprogrammed sequence, resulting in processing delays.

Accordingly, there is a need in the art for a system and method for recording and retrieving digital information on a tape wherein data error conditions are resolved in an efficient manner. Rather than perform a preprogrammed sequence of error recovery procedures, it would be desirable to tailor error recovery to the immediate cause of the data error while maintaining an ability to apply additional error recovery configuration options as required. This would provide flexibility in tactical decisions while pursuing an overall recovery strategy.

SUMMARY OF THE INVENTION

In accordance with the foregoing objectives, a tape drive data storage apparatus incorporating the inventive concepts herein includes a control system for reading and writing host data on a streaming tape medium, an error correction coding (ECC) system for detecting and correcting data transfer errors, and an error recovery system for performing non-ECC correctable error recovery. The error recovery system is dynamically controlled to perform tactical error recovery in accordance with a novel error recovery method. As the tape drive apparatus performs read and/or write data transfer operations on a tape medium loaded in the tape drive, error recovery options are implemented on the basis of dynamic feedback peculiar to the current block in error. Upon invocation of an error recovery operational mode, the data storage apparatus performs error recovery on the current data block using a predetermined set of error recovery implementation options. As error recovery progresses, the option set is scored based on its effectiveness and the score is dynamically evaluated. Ongoing error recovery on the block is performed using a refined set or subset of error recovery implementation options based on the score of the previously applied options. Additional error recovery options may be inserted as they become appropriate. The process is repeated until successful error recovery is achieved or until available error recovery implementation options are exhausted.

BRIEF DESCRIPTION OF THE PREFERRED EMBODIMENTS

The objects, advantages and features of the present invention will be more clearly understood by reference to the following detailed disclosure and the accompanying drawing in which:

FIG. 4 is a diagrammatic illustration of an RdDF_DataXR_Card_Spec data structure;

FIG. 6 is a diagrammatic illustration of a Read_Procedure_Specs data structure;

FIG. 7 is a diagrammatic illustration of a Read_Suit_Specs data structure;

FIG. 8 is a diagrammatic illustration of a Read_Deck_Spec data structure;

FIG. 9 is a diagrammatic illustration of a Read_Deck_Parms data structure;

DETAILED DESCRIPTION OF THE PREFERRED EMBODIMENTS

Figure 1:
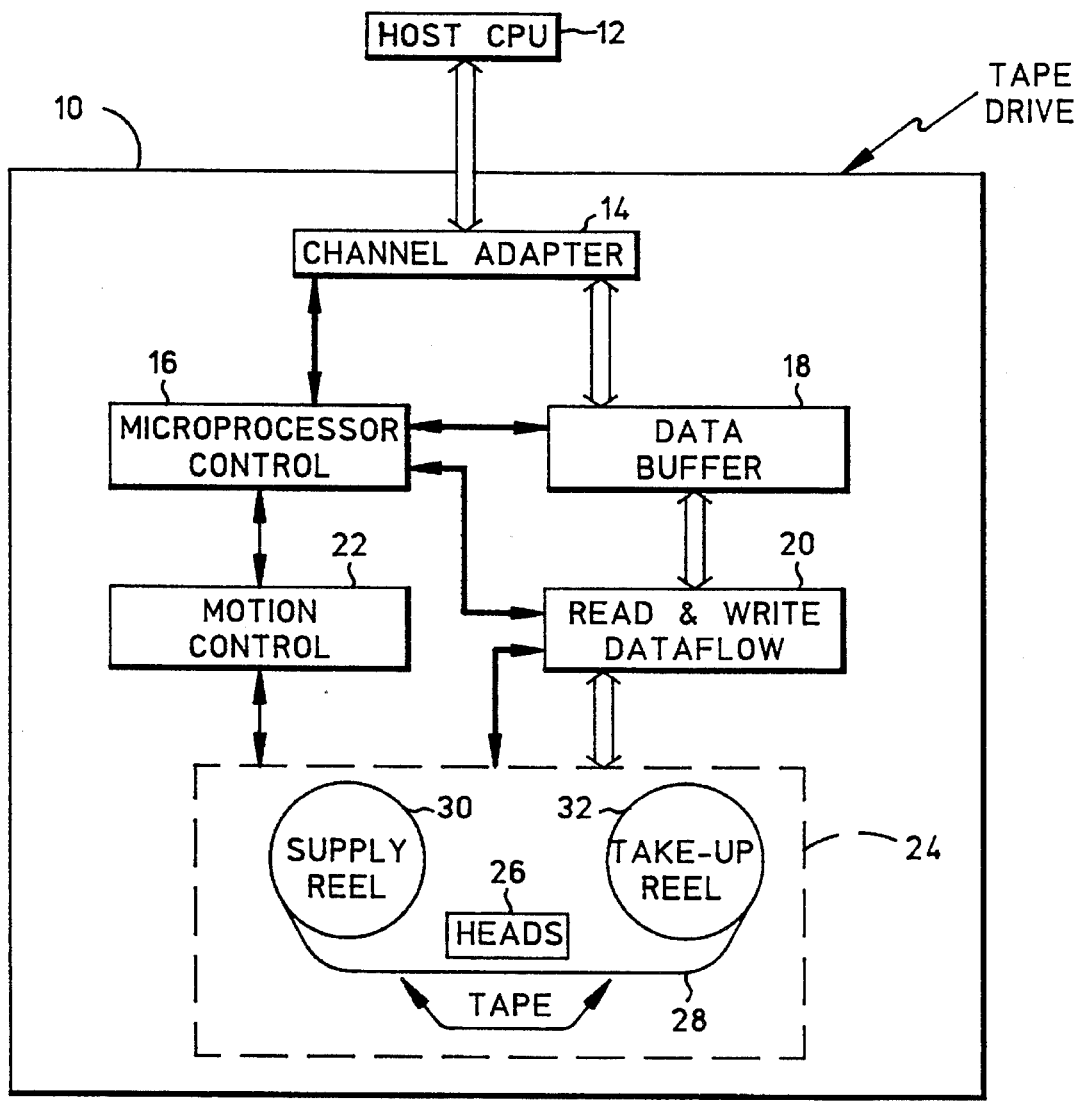
FIG. 1 is a block diagram showing a tape drive data storage device adapted for use with the present invention.

Referring now to FIG. 1, the inventive concepts herein described may be embodied in a tape drive data storage device 10 for storing (and retrieving) data provided by a host digital processing device 12, which could be a general purpose computer or other processing apparatus outputting data to be stored on a streaming magnetic tape medium. For example, the processing device 12 could be an IBM 3090 mainframe processor using the MVS or VM operating system, or an IBM AS/400 mid-range computer using the OS/400 or AIX operating system, or a network of processors, such as IBM PS/2 personal computers using the OS/2 or DOS operating system and arranged in a local area network (LAN). The tape drive 10 includes plural components providing a control system for reading and writing host data on the medium. Those components include a channel adaptor 14, a microprocessor controller 16, a data buffer 18, a read/write dataflow circuit 20, a motion control system 22 and a tape interface system 24.

The microprocessor controller 16 provides overhead control functionality for the operations of all other components of the tape drive 10. The functions performed by the microprocessor controller 16 are programmable via microcode routines, as is known in the art. During data write operations (with all dataflow being reversed for data read operations), the microprocessor controller activates the channel adaptor 14 to perform the required host interface protocol for receiving an information data block. The channel adaptor 14 communicates the data block to a data buffer 18 that stores the data for subsequent read/write processing. The data buffer 18 in turn communicates the data block received from the channel adaptor 14 to the read/write dataflow circuitry 20, which formats the device data into physically formatted data that may be recorded on a magnetic tape medium. The read/write dataflow circuitry 20 is responsible for executing all read/write data transfer operations under the control of the microprocessor controller 16. Formatted physical data from the read/write circuitry 20 is communicated to the tape interface system 24, which includes one or more read/write heads 26 and appropriate drive components (not shown) for performing forward and reverse movement of the tape medium 28 mounted on a supply reel 30 and a take-up reel 32. The drive components of the tape interface system 24 are controlled by the motion control system 22 to execute such tape movements as forward and reverse recording and playback, rewind and other tape motion functions. In addition, in multi-track tape drive systems, the motion control system 22 transversely positions the read/write heads relative to the direction of longitudinal tape movement in order to record data in a plurality of tracks.

Figure 2:
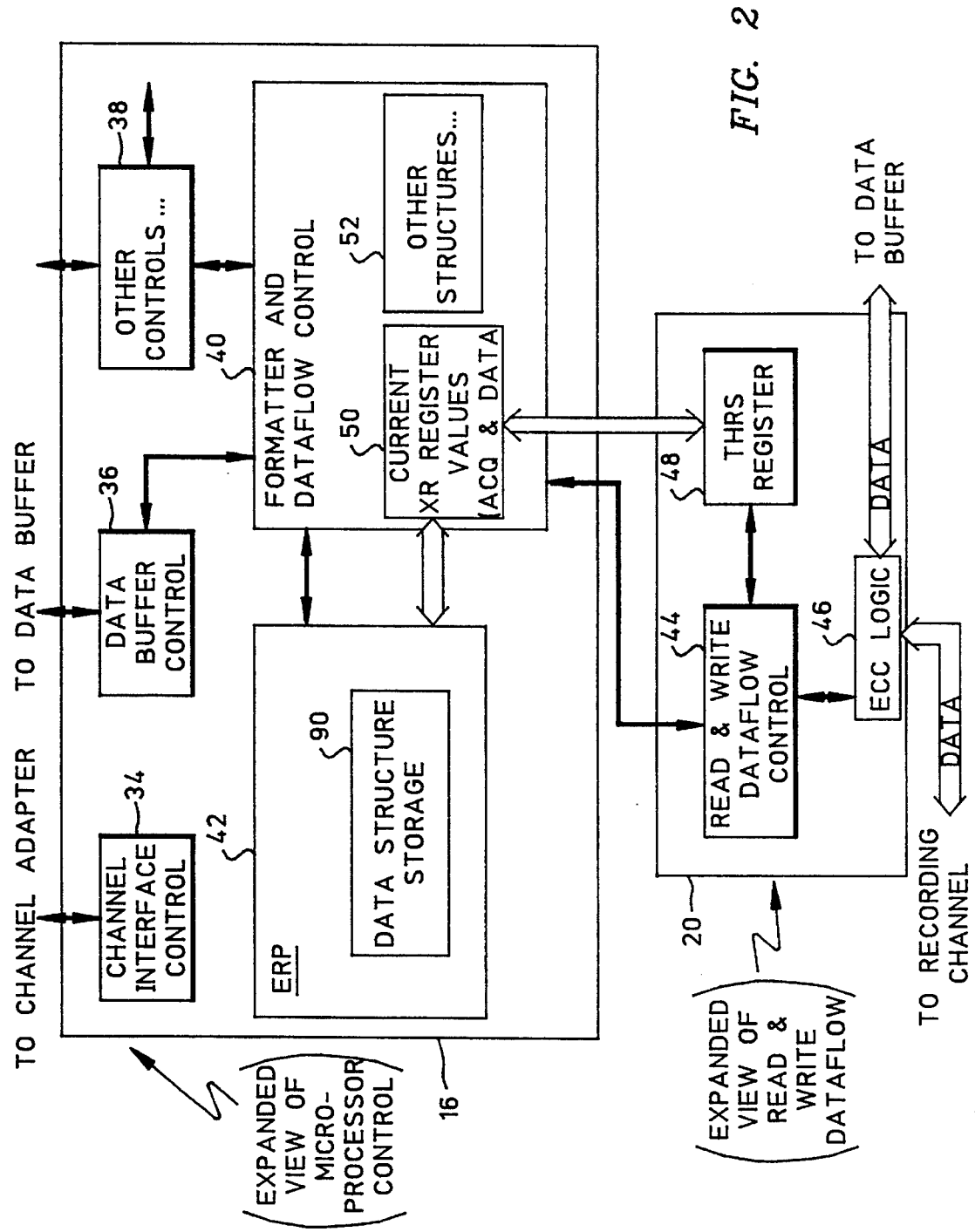
FIG. 2 is a block diagram providing an expanded view of selected components of the tape drive device of FIG. 1.

Referring now to FIG. 2, components of the microprocessor controller 16 and read/write dataflow circuitry 20 are shown in greater detail. The microprocessor controller 16 could be implemented using one of a variety of conventional programmable processors, such as INTEL Corporation's Model 960 product. The microprocessor controller 16 includes a channel interface controller 34 to implement the exchange of control information between the microprocessor controller 16 and the channel adaptor 14. The microprocessor controller 16 further includes a data buffer controller 36 to implement the exchange of control information between the microprocessor controller 16 and the data buffer 18. Other controllers, illustrated collectively by reference number 38, are used to implement the exchange of control information between the microprocessor controller 16 and other components of the tape drive control system including the motion controller 22 and other components (not shown), as is known in the art.

Additional components contained within the microprocessor controller 16 include a formatter and dataflow control system 40 and an error recovery system 42, each of which is controlled by appropriate microcode routines of the microprocessor controller 16. The formatter and dataflow control system 40 directs operations of the read/write dataflow circuitry 20, as well as the data buffer 18 via the data buffer controller 36. The error recovery system 42 is programmed to perform error recovery procedures when non-ECC correctable errors occur.

The read/write dataflow circuitry 20 includes read/write dataflow control hardware 44 that oversees read/write dataflow operations. The control hardware 44 communicates control information to ECC logic hardware 46, which performs ECC encoding/decoding of all data transferred between the data buffer 18 and the tape interface system 24.

The tape drive 10 records data on one or more data tracks of the tape medium 28 in a sequence of formatted information blocks. During ECC error correction operations, the ECC logic hardware 46 provides an ECC error correction record for each processed information block to the read/write dataflow control hardware 44. The read/write dataflow control hardware 44 stores this information in a set of status and error registers, collectively illustrated as the XR (external) registers 48 in FIG. 2. The XR registers 48 are a bank of status and control registers that reside within, and form part of, an interface between the microprocessor microcode and the tape drive logic hardware. The bits in the XR registers 48 are set to "1" or "0" or to specified ranges to control ECC operating points in the hardware.

As each information block on the tape medium 28 is processed, the information contained in the XR registers 48 are transferred to the formatter and dataflow control system 40 where it is placed in an XR value store 50. As is conventional, the formatter and dataflow controller 40 includes additional structures and components 52, whose functions are not germane to the present disclosure and therefore will not be described.

Where high density multi-track recording is utilized, multiple "data" tracks can be recorded using a smaller subset of "physical" head elements, with each data track being written by one and only one physical head element (i.e., read/write head channel), but with physical tracks writing many data tracks. This data storage protocol is achieved using multiple tape wraps and tape wrap halfs. A tape wrap consists of a pair of outbound and inbound recording/playback passes (wrap halfs) across the entire allocated length of the tape medium. The outbound recording pass represents a first wrap half while the inbound recording pass represents a second wrap half. Each wrap consists of two wrap halfs. To maximize recording densities, the read/Write heads 26 include a first set of heads that are active during the first outbound wrap half and a second set of heads that are active during the second inbound wrap half. There can be multiple wraps recorded on a tape medium. The total number of data tracks recorded on a medium is determined by multiplying the number of physical tracks or channels of the read/write heads times the number of wrap halfs recorded on the tape. For example, a tape drive that records 16 tracks per wrap half over 4 wraps generates 128 data tracks on the tape medium.

The error recovery system 42 performs error recovery in response to two general error conditions which shall be referred to as data acquisition errors and data correction errors. Data acquisition errors arise when one or more data blocks cannot be detected, isolated or synchronized between tracks. Such errors can result in block sequencing errors, voids or servo dropouts and are caused by tape tracking problems, tape slip, dirt, read/write head problems and other conditions. Data correction errors arise after a block is nominally detected, but the data therein cannot be properly decoded despite dynamic error correction using ECC techniques. Such errors typically mean that the track servo and tape drive mechanical systems are properly operating but there is some problem, such as debris, affecting the tape/head interface and causing the data decoding problem. Although error recovery can be invoked during the data read mode as well as the Read-While-Write mode, the concepts of the present invention will be discussed hereinafter within the context of a data read mode.

There are a variety of methods available to assist read error recover in the presence of data acquisition and data correction errors. They include:

1. Dataflow modifications of the base operating point. Some of the modifications compensate for data acquisition faults and others for data correction faults.

2. System modification of environmental settings, such as:
   a. Tape tension changes.
   b. Offset control of track following servo.
   c. Disabling of track following servo, coupled with independent control of head alignment with respect to data tracks on the tape storage medium.
   d. Utilization of opposite head element in designs where recording is performed in a serpentine fashion, with a set of head elements used to read in a forward direction and a paired set used to read in the reverse direction. Occasionally, a head element becomes unreliable due to a defect or debris buildup. In that case, data transfer using the opposite head element may correct the problem.
   e. Analog Read Equalization Filter Coefficients that effect the sensitivity of the recording head to detect signals on the tape.

In the tape drive 10 of FIGS. 1 and 2, the environmental configuration options including servo adjustment and tape tension can be performed in conventional fashion by the microprocessor controller 16 in conjunction with the motion control system 22. Other environmental settings, such as the adjustment of analog read equalization filter coefficients, and the activation of opposite head element data transfer, can be performed in conventional fashion by the microprocessor controller 16 in conjunction with the read/write dataflow circuitry 20.

The base operating point configuration options invoked by the microprocessor controller 16 are determined by numeric values contained in the XR registers 48, as shown in FIG. 2. The XR registers are multiple bit digital storage devices whose storage locations are loaded with the binary values "1" or "0", or specified numeric ranges, depending on the error recovery options to be set. Each XR register bit, or bit range, corresponds to a base operating point configuration option, or sequence of control. Examples of the configuration options that can be set by the XR registers 48 are the data acquisition options shown in FIG. 3, and the data correction options shown in FIG. 4. These figures illustrate data structures 60 and 62, respectively, whose respective interior columns 64 and 66 represent programmable fields within a subset of the XR registers 48. These programmable fields may be referred to collectively as forming two register subsets of the external registers 48; including a data acquisition register "AcqXR"), shown in FIG. 3, and a data correction register "DataXR"), shown in FIG. 4.

Figure 3:
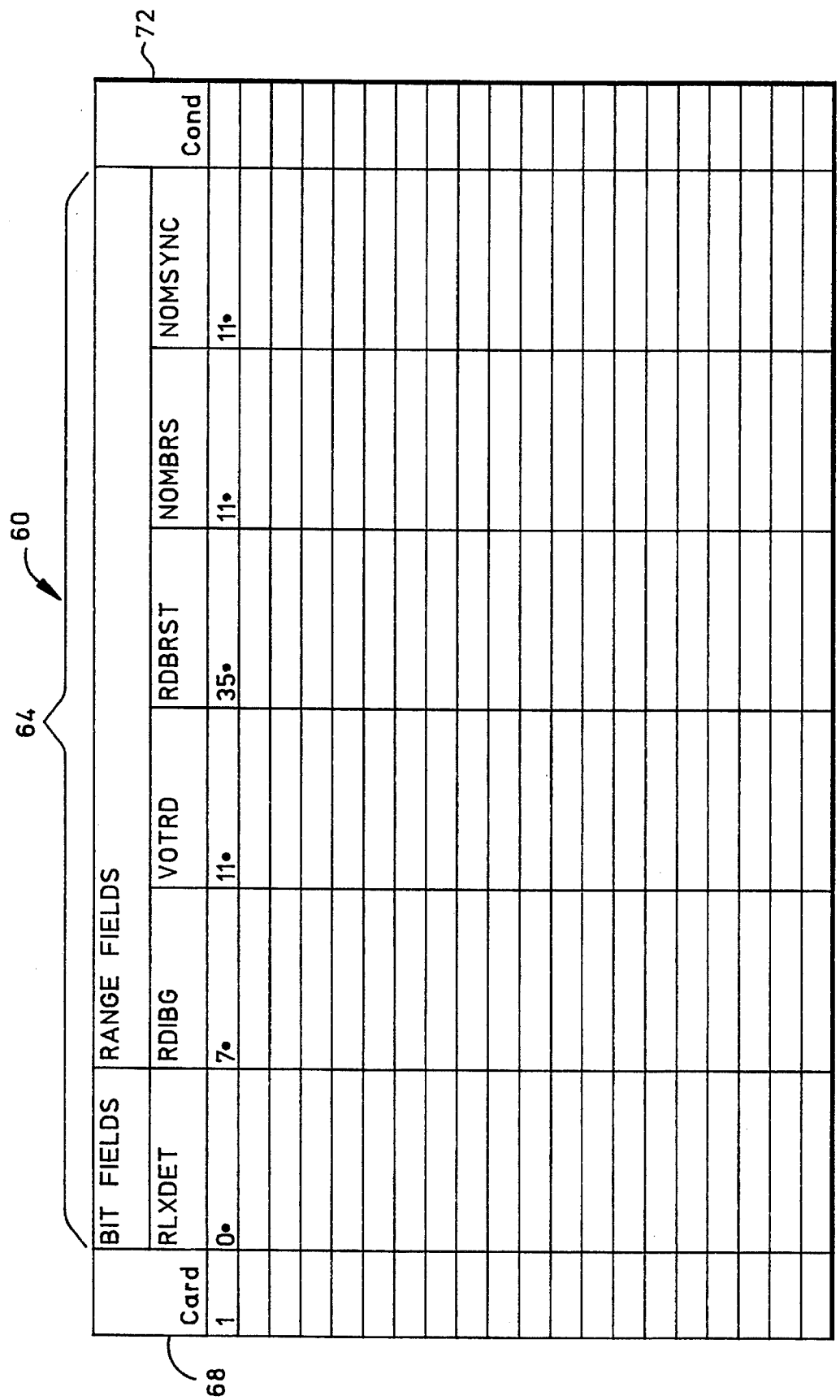
FIG. 3 is a diagrammatic illustration of an RdDF_AcqXR_Card_Spec data structure.

The interior columns 64 and 66 of FIGS. 3 and 4 correspond to various indicated base operating point configuration options. FIG. 3, for example, shows that the acquisition register AcqXR contains a bit field labelled RLXDET, and plural range fields labelled RDIBG, VOTRD, RDBRST, NOMBRS and NOMSYNC. The RLXDET field relaxes the criteria used to detect synchronization characters within data blocks on the tape. The RDIBG field sets the read threshold for detecting an inter-block gap. The VOTRD field sets the track voting threshold for reading inter-block gap detection criteria. The RDBRST field sets the pattern repetition threshold for detecting burst characters within data blocks. The NOMBRS field sets a track voting threshold for burst detection. The NOMSYNC field sets a nominal track synchronization threshold. These fields are illustrated by way of example only, it being understood that other data acquisition options could be used as desired. FIG. 4 shows that the data correction register DataXR contains plural bit fields labelled OCP, CIEXP, EXMOD, RELGN, and REACQ, and plural range fields labelled DROPT, CNTR and WNDLN. These fields all correspond to ECC pointers control and thresholds used by the data flow to acquire data from the tape storage medium. They are illustrated by way of example only, it being understood that other data correction options could be used as desired.

There are five strategic principles that may be used to dynamically redirect error recovery using the error recovery options listed above:

1. Error recovery incorporates all methods and options strategically; however, the tactics used for each incident will vary depending on interim results.

2. Data errors are intrinsically better to handle than acquisition errors. Tactics that minimize acquisition errors are preferred over other options.

3. There exist methods that have a universal effect on error recovery, and so can be held constant over a wide range of other variations. Changes in tape tension and opposite gap are examples.

4. Changes to read equalization coefficients are made on the basis of many recoveries. The effects of tape tension and read/write equalization coefficient changes are often indistinguishable. This policy will cause a significant number of recoverable read errors requiring tension changes to impose a change in read/write equalization coefficients. An excessive number of errors per data bytes processed is another criteria.

5. Tape direction (forward/backward) is a function of the microcode state machine. It can be scored and used as an error recovery option in some cases, but is normally used as a tactical decision made at a lower level.

In order to limit the number of error recovery options to be performed on a block, and to provide an environment for tactical error recovery based on dynamic feedback, one or more of the above-described error recovery Options can be abstracted into data structures and invoked in a hierarchical fashion. With the error recovery option data structures defining an error recovery implementation hierarchy, there is more freedom to choose how to use the data. At the lowest level of the hierarchy are the base operating point configuration options, which are selectively changed while environmental setting options such as track servo and tape tension are held constant. Once a selected set of base operating point configuration options has been invoked, a first order environmental setting (track servo or ECC pointer threshold level, for example), representing the next level in the error recovery hierarchy, is changed and the base operating point configuration options are again invoked. Once a selected set of first order environmental options has been invoked, a second order environmental setting (tape tension or opposite head reading or analog read equalization filter coefficients, for example), representing the highest level in the error recovery hierarchy, is changed and the base operating point configuration options and first order environmental options are again invoked.

The foregoing error recovery options are further organized into three procedures that utilize selected sets of the base operating point and environmental option settings. There are two data acquisition procedures, which shall be referred to as ACQ_PES and ACQ_IPS, and one data correction procedure, which shall be referred to as DATA. The ACQ_PES and ACQ_IPS procedures differ in their utilization of track serving. PES stands for "position error sensing" and represents a mode of error recovery in which normal track servoing is enabled. IPS stands for "incremental position setting" and represents a mode of error recovery in which normal track servoing is disabled and the read/write heads are mechanically locked in predetermined positions relative to the tape tracks. In either case, servo adjustments can be made that change the servo "offset," which determines the lateral position of the tape heads relative to the longitudinal direction of tape movement. Preferably, error recovery during one of the acquisition procedures results in data correction error recovery and a transition to the DATA procedure. As described above, data correction errors are preferred over data acquisition errors.

The manner in which the error recovery options of the tape drive 10 are implemented in the aforementioned hierarchy of base operating point and environmental options can be described using the metaphor of a deck of playing cards that are played hand by hand, bid by bid. In the playing card metaphor, a card represents a set of base operating point configuration options, which as described above, represents the lowest level in the error recovery option hierarchy. A bid constitutes the next level in the hierarchy and represents a first order environmental setting. In a preferred embodiment, a bid is a servo setting option. If servo bidding is active, selected cards are iteratively "played" as the servo settings are incrementally adjusted. Servo bids are variations in either the PES or IPS offsets. They are either "nominal", "high" or "low". A bid is made before a card is played. If more than one bid is appropriate, then that many iterations of cards can be played. In a further preferred embodiment, an ECC pointer threshold configuration option can be used for bidding during the DATA procedure, with each bid representing a change in one or more ECC pointer thresholds. A suit constitutes the next level in the hierarchy and represents a second order environmental setting such as tape tension, opposite head element reading or read equalization. Card and servo bid settings are made within the context of a suit. The concepts of a deck and a hand relate to the selection and nature of suits and bids. A deck determines the number and nature of bids and suits that will be made as cards are played. A hand determines the deck that will be played.

The foregoing metaphor will be more clearly understood by reference to FIGS. 3–9. In FIGS. 3 and 4, columns 68 and 70 list card numbers. Column 68 shows a single card number "1" and Column 70 shows card numbers "1" through "7". Each card is "played" when the XR registers 48 are loaded with the bit and range field values defined by that card and error recovery is invoked on a data block. The right hand columns 72 and 74 of the tables 62 and 64 illustrate cards that are only played in response to certain dataflow conditions as derived from the XR status registers. Cards "6" and "7" of table 66, for example, are conditioned on the tape drive 10 being in a phase-locked looping mode and a global small skew mode, respectively.

Figure 5:
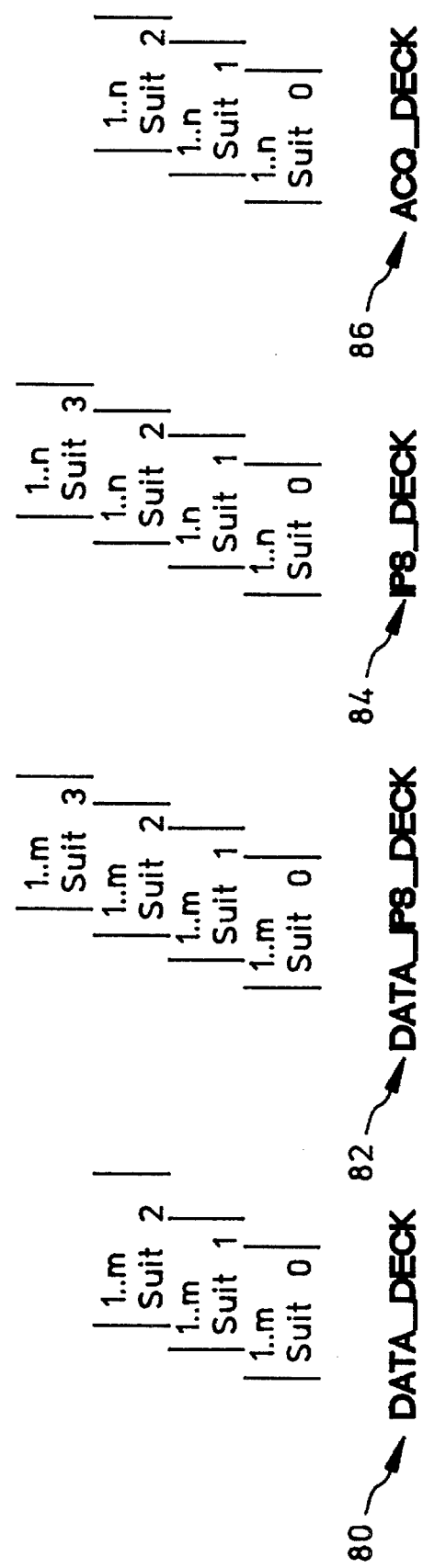
FIG. 5 is a diagrammatic illustration of a preferred strategy for implementing error recovery options.

Referring now to FIG. 5, the playing card metaphor is conceptually illustrated to more clearly identify the relationship between decks, suits and bids. FIG. 5 identifies four decks 80, 82, 84 and 86 that may be used for strategic error recovery. The deck 80, which shall be referred to as the DATA_DECK, is used for data correction error recovery during the DATA procedure described above. It utilizes no servo bids and contains three suits 0, 1 and 2. Suit 0 corresponds to a nominal tape tension condition. Suit 1 corresponds to a tension increment condition. Suit 2 corresponds to a tension decrement condition. The cards 1 ..m represent base operating point option settings that compensate for data correction problems, such as those shown in FIG. 4. Although the DATA_DECK utilizes no servo bids, it could utilize bidding based on changes to one or more ECC pointer thresholds, in which case the cards 1 ..m would be played iteratively as the ECC pointer thresholds are "bid". The deck 82, which shall be referred to as the DATA_IPS_DECK, is also used for data correction error recovery during the DATA procedure described above except that track servoing is disabled as required in the IPS mode. It utilizes three servo bids (which may also include tape direction changes) and contains four suits 0, 1, 2 and 3. Suits 0–2 are tape tension options as described above. Suit 3 corresponds to error recovery using opposite head element data detection (in a preferred embodiment, the IPS mode is mandatory when opposite head element data detection is invoked). The cards 1 ..m are played iteratively for each servo bid.

The deck 84, which shall be referred to as the IPS_DECK, is used for data acquisition error recovery during the ACQ_IPS and ACQ_PES procedures described above. It utilizes four suits 0–3, as described above, and three servo bids. The cards 1 ..n represent microcode option settings that compensate for data acquisition problems, such as those shown in FIG. 3. The cards are played iteratively for each servo bid. The deck 86, which shall be referred to as the ACQ_DECK, is used for data acquisition error recovery during the ACQ_PES procedure described above. It utilizes three suits 0–2, as described above, and seven servo bids. The cards 1 ..n are played iteratively for each servo bid.

Implementation of the card playing metaphor is achieved using data structures that are placed in a data store 90 maintained by the error recovery system 42, as shown in FIG. 20 The data structures can be generated using the conventional C programming language (via "STRUCT" variables, for example) or could be created using other known programming languages, as desired. The data structures 60 and 62 of FIGS. 3 and 4 represent card specification data structures that are used to selectively implement the base operating point configuration option sets. They shall be referred to by the identifiers RdDF_Acq XR_Card_Spec and RdDF_Data XR_Card_Spec, respectively. FIG. 6 illustrates a Read_Procedure_Specs data structure 100 containing seven columns and twenty-two rows. The rows define a sequence of error recovery "hand played" iterations and the columns provide information about each iteration. The columns contain both data and pointers to other data structures. Column 102 identifies the error recovery procedure to be implemented. Column 104 identifies the hand to be implemented. Column 106 identifies the deck to be implemented and represents a pointer to the data structure of FIG. 7. Column 108 identifies the suit to be implemented and represents a pointer to the data structure of FIG. 7. Column 110 identifies the next hand to be played. It is a pointer to column 104 of the same data structure. Column 112 identifies the hand that will be resumed if one is interrupted by a non-read/write error. It is a pointer to column 104 of the same data structure. Column 114 identifies the maximum error recovery permutations that can be invoked for a given number of base operating point configuration options. The rows are divided into three sets 116, 118 and 120 which correspond to the error recovery procedures ACQ_PES, ACQ_IPS and DATA.

FIG. 7 illustrates a Read_Suit_Specs data structure 130 containing four columns and fourteen rows. The rows define a sequence of error recovery "suit" iterations and the columns provide information about each iteration. The columns contain both data and pointers to other data structures. Column 132 identifies the error recovery deck to be implemented. It is a pointer to the data structure of FIG. 8. It is also pointed to by column 106 in the data structure 100 of FIG. 6. Column 134 identifies the suit to be implemented. It is pointed to by column 108 in the data structure 100 of FIG. 6. Column 136 identifies the suit method to be implemented, i.e., whether the tape tension is nominal or adjusted. Column 138 identifies the suit method parameter to be implemented, i.e., if tape tension is adjusted, whether the tension is incremented or decremented. The rows are divided into four sets 140, 142, 144 and 146 which correspond to the error recovery decks ACQ_DECK, IPS_DECK, DATA_DECK and DATA_IPS_DECK.

FIG. 8 illustrates a Read_Deck_Spec data structure 150 containing six columns and twenty rows. The rows define a sequence of error recovery iterations and the columns provide information about each "servo bid" iteration. The columns contain both data and pointers to other data structures. Column 152 identifies the error recovery deck to be implemented. It is a pointer to the data structure of FIG. 9, and is pointed to by column 136 in the data structure 130 of FIG. 7. Column 154 is a card identifier for tracking the error recovery card to be implemented. Column 156 (in conjunction with column 162, described below) specifies whether circular bidding is to be implemented, i.e., whether the servo settings are to be adjusted for the hand in question while the cards of the hand are repeatedly played until bidding is exhausted. Column 158 identifies the data acquisition card to be played. It points to column 68 in the data structure 60 of FIG. 3. Column 160 identifies the data correction card to be played. It points to column 70 in the data structure 62 of FIG. 4. The column 162 works in conjunction with column 156 to specify whether circular bidding is to be implemented. A value of zero in column 162 specifies a noncircular card sequence, i.e., no bidding. A non-zero value in column 162 identifies the next card to be played in a circular card sequence, i.e., circular bidding is active. It points to column 154 of the same data structure. The rows are divided into four sets 164, 166, 168 and 170, which correspond to the error recovery decks ACQ_DECK, IPS_DECK, DATA_DECK and DATA_IPS_DECK.

FIG. 9 illustrates a Read_Deck_Servo_Bid (also referred to as Read_Deck_Parms) data structure 180 containing four columns and twelve rows. The rows define a sequence of error recovery "servo bid" iterations and the columns provide information about each iteration. The columns contain both data and pointers to other data structures. Column 182 identifies the error recovery deck to be implemented. It is pointed to by column 152 of the data structure 150 of FIG. 8. Column 184 indicates whether servoing (i.e., "Drive Tape Interface (DTI) method") is enabled (PES) or disabled (IPS). Column 186 identifies the direction of tape movement, i.e., forward or reverse., In a preferred embodiment, the tape direction is forward except when the DATA procedure is invoked, in which case the tape direction alternates for servo orientation changes, or if applicable, ECC pointer threshold adjustments. Column 188 identifies the servo bid, i.e., whether the servo setting is nominal or, if not, the servo offset increment or decrement setting. The rows are divided into four sets 190, 192 and 194, which correspond to the error recovery decks ACQ_DECK, IPS_DECK, and DATA_IPS_DECK.

The data structures described above are utilized by the microprocessor controller 16 to perform tactical error recovery utilizing dynamic feedback. The error recovery microcode can be implemented via a computer program written in the conventional C programming language, or using other known programming languages, as desired. The goal of the procedure is to minimize the number of error recovery retries so that only a subset of the available error recovery permutations need to be performed to achieve successful error recovery. In accordance with the preferred approach, error recovery proceeds by classifying all possible data errors occurring on a block as either an acquisition or data correction error. When error recovery is initiated on a block, all defined hardware and microcode options suitable for the identified class of error are available. As recovery persists on the block of data, the options that were selected are scored as to their effectiveness. The scoring is cumulative in nature. All options that cause an acquisition error yield a negative score, whereas those changes that cause data correction errors yield a positive score. The scores are accumulated as scorecard values that are tracked by the microcode.

After a sufficient number of read/write retries have been attempted, the microcode assesses the scorecards. It will continue to progress through all defined options, but it will bypass those that have a history of negative results. The consequence of this approach is that the scope of error recovery becomes very dynamic from block to block. Whereas all "knobs" available to turn on the hardware are accessible, only those that seem to be effective in recovering a particular error will be utilized. The advantage of this approach is that the defined scope of error recovery can be very large. Based on dynamic feedback, the microcode can dynamically select the appropriate subset of them. Whenever a read retry is needed, the previous one is scored.

Scoring is based on block identification number. It tracks the effectiveness of utilizing servo (both track following offset control and dead reckoning step control), tension, and direction versus the set of data correction options. If subsequent read retries on the same block occur, the appropriate historical data can be recalled and used.

Figure 10:
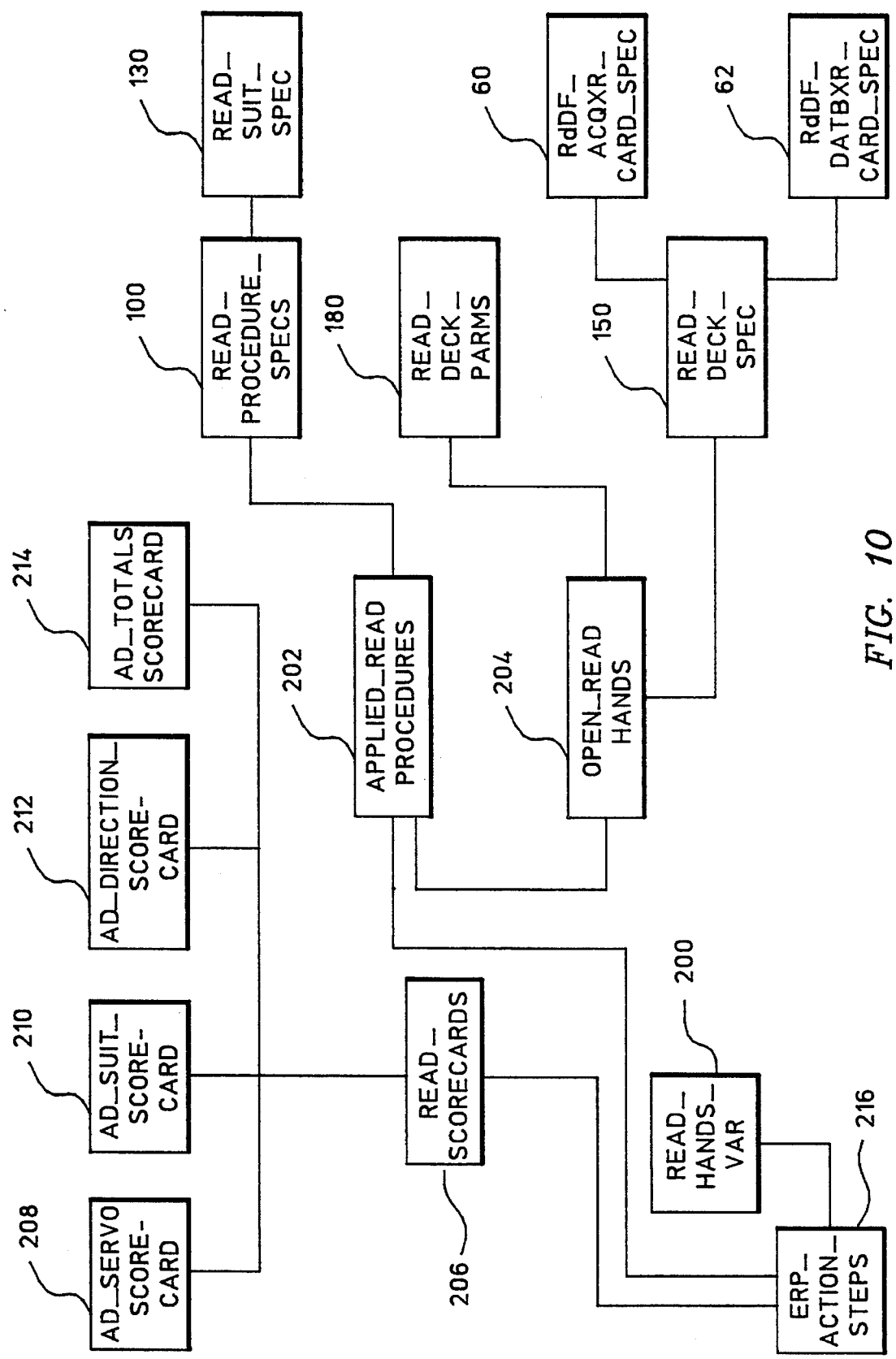
FIG. 10 is a block diagram showing a set of data structures comprising tables and variables used for tactical error recovery in accordance with the present invention.

Referring now to FIG. 10, the data structures of FIGS. 3–4 and 6–9 are shown in conjunction with additional data structures and variables that are generated during error recovery. All such data structures are conveniently maintained by the microcode in the data structure storage area 90, shown in FIG. 2. FIG. 10 illustrates the Read_Procedure_Spec data structure 100, the Read_Suit_Spec data structure 130, the Read_Deck_Spec data structure 150, the Read_Deck_Parms data structure 180, the RdDF_AcqXR_Card_Spec data structure 60, and the RdDF_DataXR_Card_Spec data structure 62. These data structures are generated and initialized when the tape drive 10 is powered-on. FIG. 10 also illustrates a group of data structures and variables that are generated and initialized whenever error recovery is initiated on a data block. They are maintained for so long as error recovery persists on the data block originally in error. In addition, simple error recovery can be compounded when errors occur in neighboring blocks on the tape. When that scenario occurs, a group of data structures is generated and maintained for each unique block number of interest. Each group of data structures includes the Read_Hands_Var data structure 200 that serves as an index used by the error recovery system 42 to track the last hand played and the scoring for that hand. The Applied_Read_Procedures data structure 202 serves as an index used to track the error recovery system's current position in the Read_Procedure_Specs data structure 100 and the Read_Suit_Spec data structure 130. Each invocation of one of the error recovery procedures described above is tracked as an "instance" that identifies the block number, the procedure, and the current deck, suite and hand. The Open_Read_Hands data structure 204 serves as an index to track the error recovery system's current position in the Read_Deck_Spec data structure 150 and the Read_Deck_Parms data structure 180. Thus, the Open_Read_Hands data structure serves as an index to the block number, and the current card and bid parameter setting. The Read_Scorecards data structure 206 bundles the error recovery scores reported by the scorecard data structures 208, 210, 212 and 214 by block identification number and by procedure (data or acquisition).

The Ad_Servo_Scorecard data structure 208 maintains scoring for the servo bid settings implemented during error recovery on the data block. This scorecard cumulatively tracks the number of HI and LO servo orientation errors for the acquisition and data procedures, trends in servo dropout during servo incrementing and decrementing, and whether a servo HI/LO excessive error ceiling has been exceeded. A servo score is also maintained for HI and LO servo orientation errors that cannot be classified as either acquistion or data errors. Such errors can occur following a data variation and are classified as "neutral" errors. If the neutral score passes a programmable threshold, it is treated negatively, like excessive acquisition errors. The Ad_Suit_Scorecard data structure 210 maintains scoring for each suit implemented during error recovery on the data block. It cumulatively tracks the number of errors for each suite used during error recovery. The Ad_Direction_Scorecard data structure 212 maintains scoring for each tape direction used during error recovery on the data block. It cumulatively tracks the number of forward and reverse direction errors for the acquisition and data procedures, as well as "neutral" errors.

The Ad_Totals_Scorecard data structure 214 maintains scoring representing a sum total of the scores reported by the other scoring data structures 208, 210 and 212. Scorecards for other error recovery options could be added, as desired.

FIG. 10 further illustrates an ERP_Action_Steps processing module identified by the reference number 216. This module encapsulates the microcode procedures used by the microprocessor controller 16 to perform tactical error recovery using dynamic feedback. The procedures invoked by the ERP_Action_Steps module 216 are illustrated in the flow diagram of FIG. 11. They utilize the information contained in the data structures described above in a manner now to be described.

Figure 11:
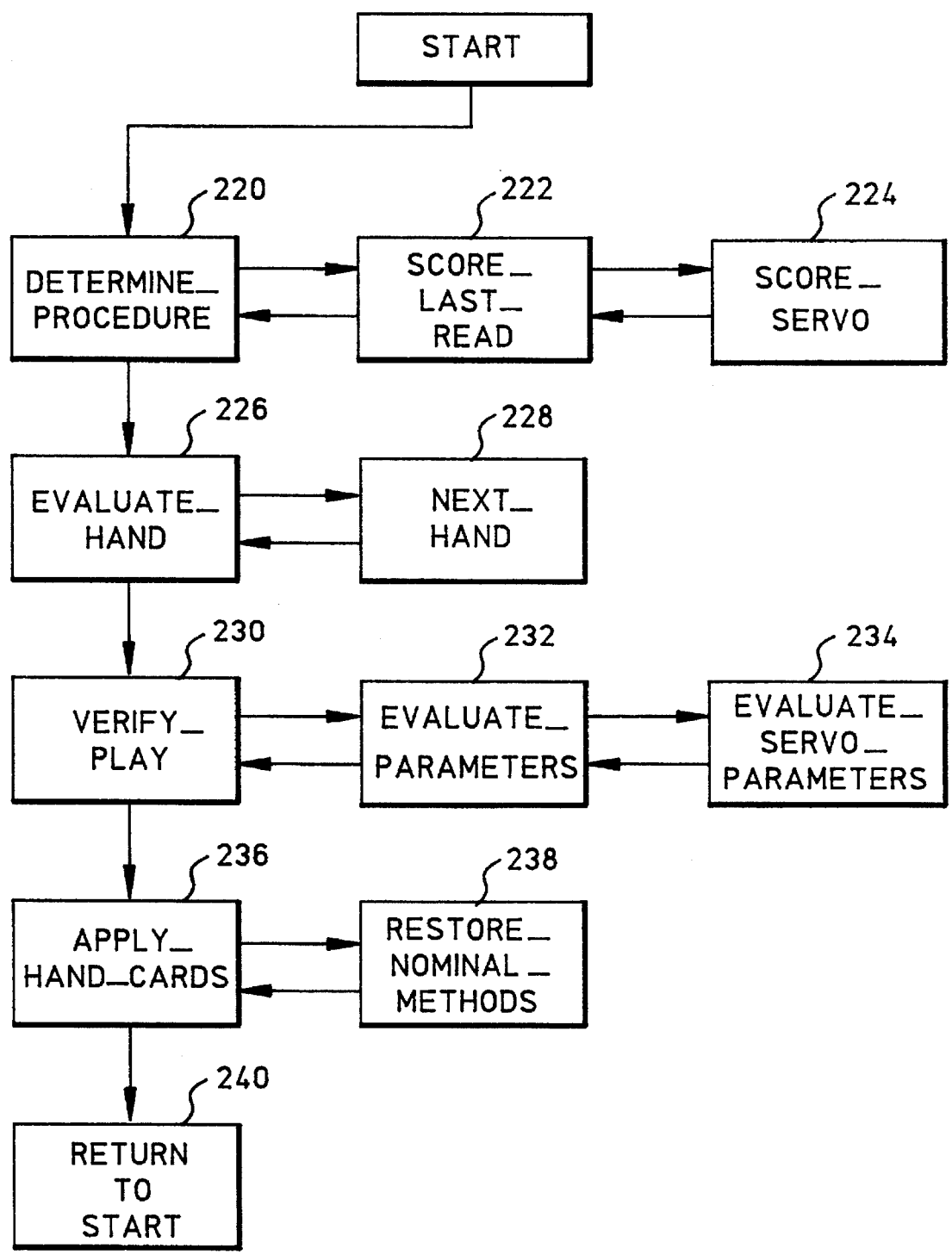
FIG. 11 is a flow diagram showing tactical error recovery procedure using dynamic feedback in accordance with the present invention.

Referring now to FIG. 11, strategic error recovery commences with the DETERMINE_PROCEDURE step identified by reference number 220. This procedure determines whether error recovery should invoke the ACQ_PES, ACQ_IPS or DATA procedures. To make this determination, it first detects whether the servo adjustment mode is IPS (servo locked) or PES (servo enabled). The procedure then determines whether a data acquisition or a data correction error caused the latest invocation of error recovery. With that information, the previous error recovery iteration is scored by calling the SCORE_LAST_READ procedure identified by reference number 222. With the last read attempt scored, DETERMINE_PROCEDURE searches for the latest hand played of the identified procedure in the Applied_Read_Procedures data structure 202. If one is not found, the first hand in the procedure is used to index a new procedure instance in the Applied_Read_Procedure data structure.

The SCORE_LAST_READ procedure 222 determines the last unscored hand from the Read_Hands_Var data structure 200. With that information, the suit score is determined and stored in the Ad_Suit_Scorecard data structure 210. The procedure SCORE_SERVO 224 is next invoked to score the Servo_IPS or Servo_PES function then being implemented and to update the Ad_Servo_Scorecard data structure 208. The Ad_Direction_Scorecard is also updated. The total error count is then updated in the Ad_Total_Scorecard data structure 214. The SCORE_SERVO procedure 224 increments the servo-assisted total error count in the Ad_Servo_Scorecard data structure 208 by data and acquisition fault. Based on the orientation or direction of the servo variation, scoring is entered as a #HI or #LO attempt by data or acquisition fault.

The EVALUATE_HAND procedure 226 is invoked following the DETERMINE_PROCEDURE 220. This procedure determines the appropriate hand to be played by evaluating the suit score or by determining that the last card in a circular bidding interation has been played. The last hand played is first consulted based on the information determined during the DETERMINE_PROCEDURE 220. To determine whether the next hand should be skipped as a result of unfavorable suit scoring, the EVALUATE_HAND procedure 222 identifies the current suit and its associated score card 210. Skipping involves invoking the NEXT_HAND procedure 228 to get the next hand indicated from the Read_Procedure_Spec data structure 100. With this information, a recursive call can be issued to invoke that hand. If skipping to the next hand is not indicated on the basis of suit scoring, the EVALUATE_HAND procedure 226 determines the next dataflow card to be played, and whether the deck is non-circular (no DTI method parameters) and has come to an end. This information is determined from the Read_Deck_Spec data structure 150. If so, the NEXT_HAND procedure is invoked to get the next hand. If the EVALUATE_HAND procedure determines that the current hand remains viable, the microcode moves to the VERIFY_PLAY procedure to evaluate the servo scores.

The NEXT_HAND procedure 228 indexes into the Read_Procedure_Spec data structure 100 using the current hand. The next hand is determined from the Read_Procedure_Spec data structure 100.

The VERIFY_PLAY procedure 230 is invoked following the EVALUATE_HAND procedure 226. This procedure seeks to determine whether targeted servo bidding should be applied or be bypassed. If servo bidding should be applied, the next card of the hand is played using the APPLY_HAND_CARDS procedure 236. If servo bidding should be bypassed, the next servo orientation or bid is evaluated by consulting the servo scorecard. In the DATA_IPS mode, the direction scorecard is also consulted because tape direction is changed in conjunction with the servo bids.

The VERIFY_PLAY procedure 230 calls the EVALUATE_PARMS procedure 232 to evaluate the servo score cards for the current hand. The EVALUATE_PARMS procedure 232 in turn calls the EVALUATE_SERVO_PARMS procedure 234. This procedure reads the Ad_Servo_Scorecard data structure 208 in conjunction with the current DTI parameter determined from the Read_Deck_Parm data structure 180. If the DTI method is HI/LO, and it also exceeds the HI/LO ceiling beyond which servo dropouts have been experienced, this result is returned to the EVALUATE_PARMS procedure. In that case, the remaining servo settings in the targeted orientation may be skipped and the next servo orientation targeted. If there is a large enough sample of read retries and the DTI method is HI/LO, and if the scoring shows little progress moving in the current direction, this result is also returned to the EVALUATE_PARMS procedure. In that case, the servo orientation may be skipped entirely and a different servo orientation targeted. the Otherwise, a favorable servo result is returned.

The EVALUATE_PARMS procedure 232 receives the result from the EVALUATE_SERVO_PARMS procedure 234 in turn reports to the VERIFY_PLAY procedure 230. A favorable status report indicates that the caller should implement the targeted parameter pointer in the Read_Deck_Parm data structure 180. An unfavorable report results in the next servo orientation being evaluated.

Following the VERIFY_PLAY procedure 230, the microcode calls the APPLY_HAND_CARDS procedure 236. This procedure applies the targeted card for a given suit and servo bid in an error recovery retry, and the pointers are thereafter advanced to the next card in the hand. In certain cases, a card may not be applied due to defined, static relationships that exist in the XR status registers. For example, a card may not be played if an ECC pointer was disregarded during block processing and if the number of pointers is excessive in relation to the number of tracks on the tape. If a card-inhibiting condition exists, the next card in the sequence is evaluated. If a new deck is to be invoked, the procedure calls the RESTORE_NOMINAL_METHODS procedure 238 to reset the suit and any DTI methods to nominal. In step 240, the microcode returns to START (from which DETERMINE_PROCEDURE was called), and subsequently repositions the tape and commences a read retry attempt.

Accordingly, a novel method for performing knowledge-based error recovery has been described. While various embodiments have been disclosed, it should be apparent that many variations and alternative embodiments Would be apparent to those skilled in the art in view of the teachings herein. It is understood, therefore, that the invention is not to be in any way limited except in accordance with the spirit of the appended claims and their equivalents.

We claim:

1. In a data storage device including a data storage medium, an input/output system for transferring information on the data storage medium, a control system, an error correction coding (ECC) system for detecting and correcting data transfer errors, and an error recovery system for performing non-ECC correctable error recovery, an automated method for performing tactical read error recovery using dynamic feedback, comprising the steps of:

(a) invoking an error recovery operational mode in said data storage device;

(b) performing error recovery using a selected set of error recovery implementation options;

(c) scoring the effectiveness of said selected set of error recovery implementation options;

(d) evaluating a score determined in said scoring step;

(e) performing error recovery using a next selected set of error recovery implementation options based on said score; and (f) repeating steps (c)–(e) until successful error recovery is achieved or until available error recovery implementation options are exhausted.

2. The method of claim 1 wherein said scoring step includes calculating a cumulative score corresponding to the effectiveness of performing a sequence of error recovery actions using successive sets of error recovery implementation options.

3. The method of claim 2 wherein said evaluation step includes utilizing said cumulative score to identify trends in error recovery implementation options sets that are not likely to prove successful and abandoning one or more of said option sets representing said trends.

4. The method of claim 1 wherein said error recovery system performs acquisition error recovery and data error recovery and wherein said scoring is based on whether error recovery using a selected implementation option set results in an acquisition error or a data error.

5. The method of claim 4 wherein acquisition errors are scored negatively and data errors are scored positively.

6. The method of claim 4 wherein said error recovery system uses a first group of base operating point error recover implementation option sets and a second group of environmental error recovery implementation options, said first group of base operating point error recovery implementation option sets being used recursively during error recovery for each environmental error recovery implementation option used.

7. The method of claim 6 wherein said environmental error recovery implementation options include a tape tension setting option.

8. The method of claim 6 wherein said environmental error recovery implementation options include a servo setting option.

9. The method of claim 6 wherein said environmental error recovery implementation options include an opposite head element utilization option.

10. The method of claim 6 wherein said environmental error recovery implementation options include a tape direction option.

11. The method of claim 6 wherein said environmental error recovery implementation options include an ECC pointer threshold configuration option.

12. The method of claim 6 wherein said environmental error recovery implementation options include first and second sets of environmental error recovery implementation options, and wherein said group of base operating point error recovery implementation option sets are used recursively during error recovery for each of said first set of environmental implementation options used, and wherein said first set of environmental implementation options are used recursively during error recovery for each of said second set of environmental implementation options used.

13. The method of claim 12 wherein said first set of environmental error recovery options include a servo adjustment option and wherein said second set of environmental error recovery options include a tape tension setting option.

14. The method of claim 13 wherein said first set of environmental error recovery options further include an ECC pointer threshold configuration option, and wherein said second set of environmental error recovery options further include an opposite head reading option and a tape direction option.

15. In a data storage device including a data storage medium, an input/output system for transferring information on the data storage medium, a control system, an error correction system for detecting and correcting data transfer errors, and an error recovery system for performing non-ECC correctable error recovery, an automated system for performing tactical read error recovery using dynamic feedback, comprising:

error recovery invocation means for invoking an error recovery operational mode in said data storage device;

error recovery performance means responsive to said error recovery invocation means for performing error recovery using a selected set of error recovery implementation options;

scoring means responsive to said error recovery performance means for scoring the effectiveness of said selected set of error recovery implementation options;

16. The system of claim 15 wherein said scoring means includes means for calculating a cumulative score corresponding to the effectiveness of performing a sequence of error recovery actions using successive sets of error recovery implementation options.

17. The system of claim 16 wherein said score evaluation means step includes means for utilizing said cumulative score to identify trends in error recovery implementation options sets that are not likely to prove successful and abandoning one or more of said option sets representing said trends.

18. The system of claim 15 wherein said error recovery system includes means for performing acquisition error recovery and data error recovery and wherein said scoring is based on whether error recovery using a selected implementation option set results in an acquisition error or a data error.

19. The system of claim 18 wherein acquisition errors are scored negatively and data errors are scored positively.

20. The system of claim 18 wherein said error recovery system uses a first group of base operating point error recover implementation option sets and a second group of environmental error recovery implementation options, said first group of base operating point error recovery implementation option sets being used recursively during error recovery for each environmental error recovery implementation option used.

21. The system of claim 20 wherein said environmental error recovery implementation options include a tape tension setting option.

22. The system of claim 20 wherein said environmental error recovery implementation options include a servo setting option.

23. The system of claim 20 wherein said environmental error recovery implementation options include an opposite head element utilization option.

24. The system of claim 20 wherein said environmental error recovery implementation options include a tape direction option.

25. The system of claim 20 wherein said environmental error recovery implementation options include an ECC pointer threshold configuration option.

26. The system of claim 20 wherein said environmental error recovery Implementation options include a first and second sets of environmental error recovery implementation options, and wherein said group of base operating point error recovery implementation option sets are used recursively during error recovery for each of said first set of environmental implementation options used, and wherein said first set of environmental implementation options are used recursively during error recovery for each of said second set of environmental implementation options used.

27. The system of claim 26 wherein said first set of environmental error recovery options include a servo adjustment option and wherein said second set of environmental error recovery options include a tape tension setting option.

28. The system of claim 27 wherein said first set of environmental error recovery options further include an ECC pointer threshold configuration option, and wherein said second set of environmental error recovery options further include an opposite head reading option and a tape direction option.

29. In a data storage device including a data storage medium, an input/output system for transferring information on the data storage medium, a control system, an error correction coding (ECC) system for detecting and correcting data transfer errors, and an error recovery system for performing non-ECC correctable error recovery, an automated method for performing tactical read error recovery using dynamic feedback, comprising the steps of:

(a) invoking an error recovery operational mode in said data storage device, said error recovery system performing acquisition error recovery and data error recovery;

(b) performing error recovery using a selected set of error recovery implementation options;

(c) scoring the effectiveness of said selected set of error recovery implementation options, said scoring step including calculating a cumulative score corresponding to the effectiveness of performing a sequence of error recovery actions using successive sets of error recovery implementation options, said scoring being based on whether error recovery using a selected implementation option set results in an acquisition error or a data error, acquisition errors being scored negatively and data errors being scored positively;

(d) evaluating a score determined in said scoring step, said evaluation step including utilizing said cumulative score to identify trends in error recovery implementation options sets that are not likely to prove successful and abandoning one or more of said option sets representing said trends;

(e) performing error recovery using a next selected set of error recovery implementation options based on said score; and (f) repeating steps (c)–(e) until successful error recovery is achieved or until available error recovery implementation options are exhausted;

said error recovery system including a first group of base operating point error recovery implementation option sets and a second group of environmental error recovery implementation options, said first group of base operating point error recovery implementation option sets being used recursively during error recovery for each environmental error recovery implementation option used;

said environmental error recovery implementation options further including first and second sets of environmental error recovery implementation options, said first set of environmental error recovery options including a servo adjustment option and said second set of environmental error recovery options including a tape tension setting option, said group of base operating point error recovery implementation option sets being used recursively during error recovery for each of said first set of environmental implementation options used, and said first set of environmental implementation options being used recursively during error recovery for each of said second set of environmental implementation options used.

30. In a data storage device including a data storage medium, a control system and an error recovery system, an automated method for performing tactical read error recovery using dynamic feedback comprising the steps of:

(a) invoking an error recovery operational mode in said data storage device;

(b) performing error recovery using a selected set of error recovery implementation options;

(c) scoring the effectiveness of said selected set of error recovery implementation options;

(d) evaluating a score determined in said scoring step;

(e) performing error recovery using a next selected set of error recovery implementation options based on said score; and (f) repeating steps (c)–(e) until successful error recovery is achieved or until available error recovery implementation options are exhausted.

31. In a data storage device including a data storage medium, a control system and an error recovery system, an automated system for performing tactical read error recovery using dynamic feedback, comprising:

error recovery invocation means for invoking an error recovery operational mode in said data storage device;

error recovery performance means responsive to said error recovery indication means for performing error recovery using a selected set of error recovery implementation options;

scoring means responsive to said error recovery performance means for scoring the effectiveness of said selected set of error recovery implementation options;

score evaluation means responsive to said scoring means for evaluating a score determined by said scoring means;

said error recovery performance means including error recovery selection means for performing error recovery using a next selected set of error recovery implementation options based on said score; and said error recovery performance means further including error recovery repetition means for repeatedly implementing said error recovery selection means until successful error recovery is achieved or until available error recovery implementation options are exhausted.

* * * * *